United States Patent Office 3,824,231
Patented July 16, 1974

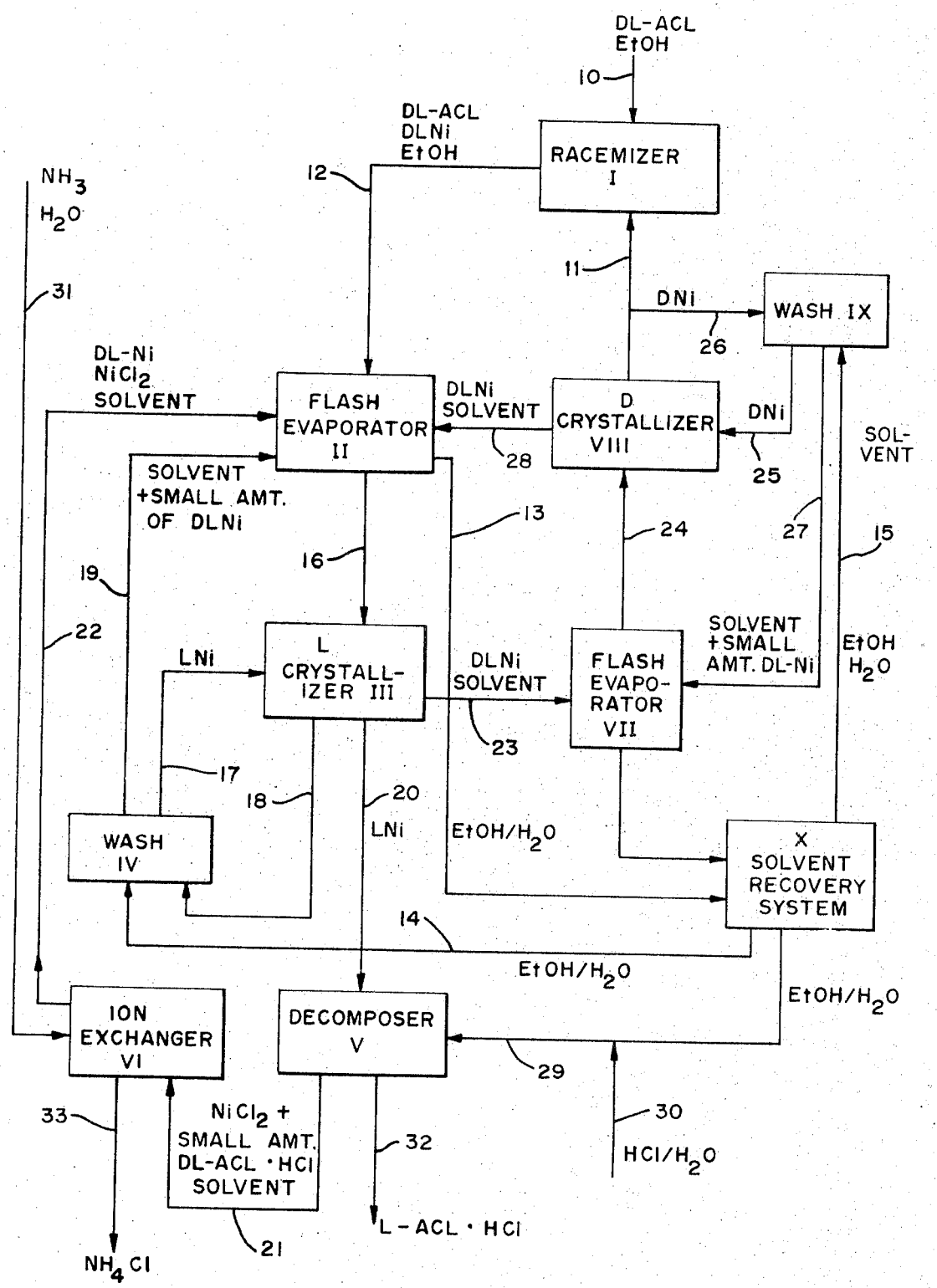

3,824,231
RESOLUTION OF α-AMINOCAPROLACTAM
Anne Marie Kubanek, Basking Ridge, Stylianos Sieniades, Madison, and Robert Fuhrmann, Hanover, N.J., assignors to Allied Chemical Corporation, New York, N.Y.
Filed Oct. 27, 1972, Ser. No. 301,409
Int. Cl. C07d 41/06
U.S. Cl. 260—239.3 R                    11 Claims

ABSTRACT OF THE DISCLOSURE

L-α-aminocaprolactam is obtained by a process comprising the steps of:
(a) Forming a complex of D,L-α-aminocaprolactam with a metal ion selected from the group consisting of $Ni^{++}$, $Co^{++}$, $Cu^{++}$, $Fe^{++}$, $Fe^{+++}$ and $Zn^{++}$;
(b) Optically resolving said D,L-α-aminocaprolactam metal complex whereby separate phases rich in D and L-α-aminocaprolactam metal complex, respectively, are obtained;
(c) Recovering and decomposing L-α-aminocaprolactam metal complex to afford L-α-aminocaprolactam plus metal ion; and
(d) Racemizing D-α-aminocaprolactam metal complex to afford D,L-α-aminocaprolactam metal complex.

BACKGROUND OF THE INVENNTION

L-lysine is one of the nutritionally essential amino acids. Its widespread use as a dietary supplement has unfortunately been inhibited by the difficulty of producing it cheaply. The problem is, of course, that only L-lysine is nutritionally valuable. Although many synthetic methods have been proposed, all non-biological methods have entailed preparation either of D,L-lysine or a D,L-racemic mixture of a lysine precursor which must then be resolved, with only one optical isomer being transformed into L-lysine. No commercially satisfactory method of optically resolving either D,L-lysine or any D,L-lysine precursor is apparently known to the art.

It is known that α-aminocaprolactam can be ring opened to afford lysine. It is further known that D,L-α-aminocaprolactam can be optically resolved and that the L-α-aminocaprolactam ring can be opened to afford L-lysine.

It is an object of this invention to provide a rapid and effective method of resolving D,L-α-aminocaprolactam and recovering the L-isomer thereof.

It is a further object of this invention to provide a method of resolution which permits facile racemization and recycle of D-α-aminocaprolactam.

Further objects and advantages will become apparent from the description of the invention which follows in greater detail.

DETAILED DESCRIPTION OF THE INVENTION

These and other objects are accomplished in accordance with the instant invention by a process comprising the steps of:
(a) Forming a complex of D,L-α-aminocaprolactam with a metal ion selected from the group consisting of $Ni^{++}$, $Co^{++}$, $Cu^{++}$, $Fe^{++}$, $Fe^{+++}$ and $Zn^{++}$;
(b) Optically resolving said D,L-α-aminocaprolactam metal complex whereby separate phases rich in D- and L-α-aminocaprolactam metal complex, respectively, are obtained;
(c) Recovering and decomposing L-α-aminocaprolactam metal complex to afford L-α-aminocaprolactam plus metal ion; and
(d) Racemizing D-α-aminocaprolactam metal complex to afford D,L-aminocaprolactam metal complex.

The complexing of the D,L-α-aminocaprolactam mixture with the metal ion is accomplished by contacting the α-aminocaprolactam and metal ion. This is most readily accomplished by adding a salt of the metal to a solution of D,L-α-aminocaprolactam or alternatively, adding D,L-α-aminocaprolactam to a metal salt solution or by mixing solutions of each together. The mole ratio of metal ion to D,L-α-aminocaprolactam in the combined solution can suitably range from about 1:4 to 1:2, preferably about 1:3.

The particular salt of the metal chosen is not of particular significance as it does not significantly influence the complex formation except insofar as it must meet the requirement of dissolving without decomposition in the D,L-α-aminocaprolactam containing solvent at the desired operating temperature to an extent sufficient to provide the requisite concentration of metal ion. Preferably, the chloride or nitrate salts of the above-indicated metals are utilized. The preferred metal ion is $Ni^{++}$.

Complex formation occurs rapidly on admixing the metal salt and the D,L-α-aminocaprolactam. The reaction temperature for complex formation can suitably range from about 10° C. up to about 100° C. The preferred temperature ranges from about 35° C. up to the boiling point at atmospheric pressure of the solvent chosen. Temperatures above the atmospheric pressure boiling point, although entirely operable, require pressure equipment and are therefore inconvenient.

Any solvent which will dissolve both the metal salt and the α-aminocaprolactam without reaction is suitable. The preferred solvents are methanol, ethanol, n- or iso-propanol and mixtures thereof, with each other and/or with up to about 50 wt. percent water. Water concentration greater than about 50% water is undesirable in that it makes it difficult to crystallize the L-α-aminocaprolactam metal complex in step (b).

As heretofore indicated, step (b) of the instant process entails a resolution of the D,L-α-aminocaprolactam/metal complex.

By resolution is meant the preferential crystallization of the metal complex of either the D or L isomer of α-aminocaprolactam. For example, crystallization of the L-isomer is achieved by seeding the solution containing D,L-α-aminocaprolactam metal complex with crystals of L-α-aminocaprolactam metal complex, which crystals have been previously obtained as will be explained hereinafter. On addition of the seed crystals the L-isomer in solution will preferentially crystallize out around such seed crystals and precipitate leaving the solution mother liquor rich in the D-isomer. If a single stage process was being utilized, the solution after seeding would merely be allowed to stand, preferably with cooling, until precipitation, i.e., crystallization of L-α-aminocaprolactam had substantially fully ceased. Of course, if the seed crystal is D-α-aminocaprolactam metal complex, then, of course, the D-isomer will be preferentially precipitated.

The metal complexes of the instant invention have the surprising advantage of preferentially initiating crystallization of the same isomer as the seed in extremely high purity. We have found for example, that using seed crystals of the L-isomer, the crystals formed contain over 90% L-isomer. It is believed that several molecules of α-aminocaprolactam are complexed, i.e., coordinated with a single metal ion. On seeding with L-α-aminocaprolactam metal complex essentially only the metal complex in solution wherein all the molecules of α-aminocaprolactam coordinated with a given metal ion are the L-isomer crystallizes out. Thus, on a given seeding, only a comparatively small percentage of the L-α-aminocaprolactam present in solution will precipitate as the metal complex, since only a small percentage of the complex present in solution at any one time contains exclusively L-isomer. Although complex formation is undoubtedly an equilibrium process, the formation after the first crop of crystals had been removed of all additional L-isomer metal complex in solution which could then be crystallized out by L-isomer seed crystals would be extremely slow. This is because the solution of mother liquor would be somewhat enriched in D-isomer following removal of the first crop of exclusively L-isomer crystals.

A single stage resolution process would be relatively inefficient since it would not only be slow, but would also leave a mother liquor only slightly enriched in D-isomer which to provide adequate yield, would then have to be racemized, concentrated and again seeded. A preferred method entails passing the D,L-α-aminocaprolactam/metal complex solution over alternate beds of D- and L-seed crystals. On contacting a solution of either isomer with a D- or L-seed bed, a portion of that same optical isomer present in the solution will precipitate out. The solution need not be contacted with seed bed for a prolonged period since precipitation is rapid and a continuous cyclic process is involved. After each precipitation, the mother liquor is re-enriched with additional D,L-α-aminocaprolactam metal complex and/or part of the solvent evaporated off to concentrate the solution and thereby facilitate further precipitation of the other isomer, and the solution then passed to a seed bed of the other isomer which isomer is preferentially precipitated. After passing over the alternate isomer seed beds with concentration or enrichment after each precipitation, the solution will contain approximately equivalent concentrations of both isomers. New D,L-mixture is continuously added to the recycling process stream, with D and L isomer crystals being separately deposited from the solution onto the beds. The D-crystals are racemized and recycled. The L-crystals are the desired product and are then further treated as hereinafter described.

The more concentrated the starting solution, the more readily crystallization occurs. However, we have found that solutions containing from about 10 to about 60 wt. percent dissolved complex are most suitable for use in the instant process. Obviously, the initial solution which is contacted with the seed crystals in either a single stage or a continuous process as above described, need not be exactly a 50/50 mixture of D- and L-isomers.

The term "seed bed" as used herein is well known in the crystallization art and connotes either a fixed or fluidized crystal bed or even a simple stirred vessel containing seed crystals.

The amount of seed crystals used to initiate crystallization from the solution can vary widely but ordinarily it is desirable to contact the solution with at least about 1.0 wt. percent of seed crystal based on the weight of the mixture of isomers present in solution. Since the process of the instant invention can produce both pure D- and L-α-aminocaprolactam metal complex, a portion of such product is ordinarily used for seed crystals. The prior art has also taught other methods of producing L- or D-α-aminocaprolactam. To get the initial batch of seed crystals one can alternatively obtain both L- and D-α-aminocaprolactam by such known prior art method and then form the desired complex thereof with metal ion as hereinabove described.

The next step in our process is directed to recovering uncomplexed L-α-aminocaprolactam. To effectuate such recovery, the L-α-aminocaprolactam metal complex which has crystallized out is dissolved in solvent, preferably a $C_1$ to $C_3$ aqueous alcohol, and treated with any strong non-oxidizing mineral acid, preferably hydrochloric, sulfuric, or phosphoric. The acid effects decomposition of the complex and the simultaneous precipitation of the L-α-aminocaprolactam as the acid salt. The decomposition can be effected at any temperature above about 0° C. For convenience sake, it is ordinarily effected at ambient or slightly above ambient temperature.

The preferred acid for decomposition of L-α-amino-caprolactam metal complex is hydrochloric acid. Use of this acid provides the following unexpected advantage: Normally the L-α-aminocaprolactam metal contains small but definite amounts of D,L-α-aminocaprolactam metal complex. We have found that when the decomposition of the complex is effected by hydrochloric acid, the α-aminocaprolactam hydrochloride which crystallizes out is essentially optically pure, i.e. it is composed almost exclusively of L-α-aminocaprolactam hydrochloride. The small amount of D,L-α-aminocaprolactam hydrochloride, which is also produced during the decomposition, remains in solution.

Since the L-α-aminocaprolactam is ordinarily further utilized in the form of its acid salt, this is the preferred form of this material. This acid salt can be ring opened by known methods to afford lysine. The mother liquor contains the metal ion and can be recycled for complexing with fresh D,L-α-aminocaprolactam in step (a).

The final step in our process entails racemization of the D-α-aminocaprolactam metal complex rich phase to afford D,L-α-aminocaprolactam metal complex which is then recycled to step (b). The racemization is effected by heating a solution of the D-isomer in the presence of at least a catalytic amount of base at a temperature of at least about 100° C. It should be noted that such temperatures will usually require super-atmospheric pressures but this does not otherwise affect the course of the racemization. The preferred solvent is a $C_1$ to $C_3$ alkanol which may contain up to 50 wt. percent water, i.e., the preferred solvent of the previous steps. Racemization requires the presence of a catalytic amount of base. Such base can be either an inorganic base such as an alkali or alkaline earth metal hydroxide or alkoxide or an organic base such as an amine. The preferred base is D,L-α-aminocaprolactam. When using this latter base to effect racemization, the preferred procedure is to add D,L-α-aminocaprolactam to a solution of the D-isomer metal complex and heat this mixture. Racemization of the D,L-complex can take from 15 minutes up to several hours depending upon the temperature and concentration of complex and base. The higher the temperature and/or concentration of ingredients, the more rapid the racemization. When racemization is complete, one has a solution containing D,L-α-aminocaprolactam metal complex plus some uncomplexed D,L-α-aminocaprolactam. Additional metal ion is then added to complex all the D,L-α-aminocaprolactam and the solution is then ready for resolution (step b) as hereinabove described.

EXAMPLE 1

(a) Illustrative Preparation of Complex Tri-(L-α-Aminocaprolactam) Nickel (II) Chloride, (L-ACL)$_3$NiCl$_2$ NiCl$_2$·6H$_2$O, 2.38 g. (10 mmole) was dissolved in 15 ml. of refluxing absolute EtOH. α-ACL, 3.84 g. (30 mmole) was added and the mixture was refluxed. Crystals started forming in about 1 min. Reflux was continued for 10 more min. then the mixture was cooled to 40° C., filtered, the blue crystals were washed at room temperature with 15 ml. EtOH, dried in vacuo at 50° C. Yield 4.50 g. Equivalent weight=280 g./Cl$^-$ (theory for (L-ACL)$_3$NiCl$_2$ 257 g./Cl$^-$), $(\alpha)_D^{25}$=—23.8° ±0.5° (c.=3.5, 1N HCl). Analysis showed that the crystals combined 5.2% H$_2$O and some EtOH.

(b) Resolution

The following procedure was adopted for resolution of the complex: DL-ACL and NiCl$_2$·6H$_2$O in molar ratio 3:1 were dissolved in hot ethanol to form a concentrated solution of DL-complex. This high concentration is achieved by forming the complex in situ. Then seeds of L-complex were added and the mixture was kept at 50° C. with occasional stirring or shaking. After measured time, as shown by the several runs summarized in Table A, the mixture was filtered, and the weight and optical purity of the crystals were determined. In the first group of data, the amounts of DL-complex and seed were kept constant. A gradual increase of the degree of resolution with time is evident. The purity of the crop remained high and essentially constant. Up to 17% of the available L-ACL may be crystallized out in 50 minutes. The rate of crystallization increased for the first 13–20 minutes and then declined. The initial induction period is probably due to a seasoning process involving the seed crystals as demonstrated by using seed crystals which had been seasoned for 10 minutes in ethanol prior to introduction into the supersaturated solution of DL-complex. The rate of crystallization reached a maximum at 10 minutes in this case (third group of data in Table A). Increasing the amount of seed increased, as expected, the rate of crystallization. One run to illustrate greater detail is set forth in Example 2 and summarized in Run #5 in Table A. In all cases, the optical purity of the crop was over 90%.

EXAMPLE 2

Resolution of (DC-ACL)$_3$NiCl$_2$ by Seeding 0.476 parts (2 mole) NiCl$_2$·6H$_2$O, 0.770 parts (6 mole) L-ACL, and 1.70 parts EtOH were placed in a sealed glass vessel containing a magnetic bar. The vessel was immersed in a water bath at 80°–90° C. until no solids remained in the dark blue solution (2–3 minutes). Then 0.089 parts of (L-ACL$_3$-NiCl$_2$, equivalent weight 280 g./Cl$^-$, was added and the vial was placed in a thermostated bath at 50° C. The contents were magnetically stirred for 10 seconds at the beginning, and thereafter for 10 seconds every 10 minutes. After 20 minutes, the vessel was shaken vigorously 2–3 times to loosen up its contents, the mixture was filtered by suction through medium frit and the blue crystals were washed with 4 parts EtOH and dried in vacuo at 50° C. Yield 0.160 parts, equivalent weight 280 g./Cl$^-$ $(\alpha)_D^{25} = -22.6°$ (c.=3, 1N HCl) or optical purity of L-complex 97%.

Total L-complex=0.160×0.97=0.155 parts
Seed L-complex=0.089 parts
Gain L-complex=0.066 parts This represents a gain 74% with respect to seed and 11.8 with respect to L-ACL available in the DL-ACL charged.

TABLE A.—Resolution of (DL–ACL)$_3$NiCl$_2$ by Seeding

Temperature: 50° C.
Solvent: 1.82 g. EtOH:H$_2$O 8:1 (w./w.)
DL-Complex (EW=280 g./Cl$^-$): 1.12 g. formed in situ

| Run number | L seed, mg. | Time, minutes | Crop Mg. | Crop Opt. purity, percent | Resolution Percent seed | Resolution Percent charge[1] |
|---|---|---|---|---|---|---|
| 1 | 81 | 10 | 99 | 100 | 22 | 3.2 |
| 2 | 88 | 13 | 148 | 99 | 50 | 8.0 |
| 3 | 89 | 20 | 172 | 97 | 88 | 13.9 |
| 4 | 90 | 20 | 164 | 92 | 68 | 10.9 |
| 5 | 89 | 22 | 160 | 97 | 74 | 11.8 |
| 6 | 91 | 30 | 179 | 94 | 81 | 13.5 |
| 7 | 88 | 40 | 181 | 96 | 93 | 14.9 |
| 8 | 89 | 50 | 195 | 96 | 112 | 17.6 |
| 9 | 208 | 15 | 294 | 94 | 32 | 12.0 |
| 10 | [2]91 | 5 | 106 | 96 | 13 | 2.1 |
| 11 | [2]93 | 10 | 136 | 99 | 45 | 7.5 |
| 12 | [2]89 | 15 | 152 | 91 | 55 | 8.8 |

[1] Resolution as percent of L-ACL available in the DL-ACL charged.
[2] Seeds aged for 10 minutes in EtOH.

EXAMPLE 3

Decomposition of (L-ACL)$_3$NiCl$_2$ (#329116–6)

L-aminocaprolactam nickel chloride complex 2.05 parts (3.67 mole) of 91% optical purity, was stirred for 30 min. at 70° C. to 80° C. with 3 parts ethanol, 1 part water and 0.40 parts (11 mole) hydrogen chloride. The mixture was allowed to cool to 25° C., then it was filtered and the colorless crystals were washed with ethanol and dried in vacuo at 50° C. Yield 1.56 parts L-(ACL-HCl (86% of total ACL, or 95% of L-ACL charged), $(\alpha)_D^{25} = -26.7°$ (c.=2, 1 N HCl) or 100% optically pure L-ACL·HCl. A 10% aqueous solution of the product gave a faint pink color with dimethylglyoxime, indicating the presence of traces of Ni$^{++}$, estimated colorimetrically as ~150 p.p.m. Ni$^{++}$.

EXAMPLE 4

Elimination of Ni$^{++}$ Traces from ACL·HCl (32916–10)

DL-ACL·HCl (1 g.) was dissolved in 10 ml. of an aqueous solution containing 50 p.p.m. Ni$^{++}$. The solution was passed within 5 minutes through 15 ml. of chelating resin Chelex–100 in the H$^+$ form, at 60° C. The resin was subsequently washed with 10 ml. H$_2$O in 5 minutes. At this point, only traces of ACL remained in the resin. The combined liquors were analyzed for N$^{++}$ colorimetrically: 5 drops bromine/H$_2$O were added to the liquors, followed by 0.5 ml. 14 N NH$_4$OH and 0.5 ml. of 1% ethanolic dimethylglyoxime and made up to 25 ml. with H$_2$O. The optical density was zero. A standard containing 1 g. DL-ACL·HCl and 0.5 p.p.m. Ni$^{++}$ with respect to DL-ACL·HCl had OD=4.5 after similar treatment with dimethylglyoxime.

EXAMPLE 5

Resolution of (DL-ACL)$_3$NiCl$_2$ (Continuous Process)

Liquors with excess (.067 parts Li-N)

(L-Ni=L-ACL-NiCl$_2$ complex)

enter a L-crystallizer where they are mixed with (.141 parts) crystalline L-Ni. The crystals which formed on the seed (contain .275 parts L-Ni, which represents a net gain of .067 parts L-Ni) correspond to upwards of 12% resolution based on the L-Ni available in the DL-Ni complex charged. About half the crop is recyled to the L-crystallizer after a wash which eliminates the DL-Ni impurity. The rest is decomposed with HCl and L-ACL is crystallized out, free of DL impurity. The level of resolution based on net L-ACL·HCl is about 24% (100% efficiency assumed in the crystallization of L-ACL·HCl in the decomposer). The parts expressed in parentheses in the description of the continuous process are illustrative only. The mother liquors from the L-crystallizer are now concentrated by flashing in order to restore the supersaturation level prior to introduction in the D-crystallizer. This is necessary because that level of supersaturation cannot be reached by dissolving DL-Ni. In fact, crystalline DL-Ni is used nowhere in this process. In the D-crystallizer, the liquors are mixed with D-Ni seeds and resolution takes place. The DL-Ni charge is somewhat smaller in the D-crystallizer than in the L-crystallizer. This discrepancy may be avoided by directing some of the feed from the racemizer to the D branch. Consequently, a longer residence time is required in order to obtain some amount of D-Ni as L-Ni in the L-crystallizer. The mother liquors from the D-crystallizer are sent through a flash to the L-crystallizer to complete the main loop. The crystals are split as in the L branch. One part is washed and recycled as seed. The other part, corresponding to 24% resolution of charged DL-Ni, is sent to the racemizer where it is heated with feed DL-ACL. The resulting mixture of DL-ACL/DL-Ni is mixed with NiCl$_2$ stoichiometric to DL-ACL and, after flashing off excess solvent, is sent to the L-crystallizer. The source of NiCl$_2$ is the decomposer. Before being recycled, the NiCl$_2$ solution is freed from a small amount of HCl (combined with DL-ACL) by treatment with an ion exchanger.

A flow sheet illustrative of a continuous process is shown in FIG. 1. Fresh, D,L-α-aminocaprolactam dissolved in ethanol is fed at 10 into racemizer I along with D-α-aminocaprolactam nickel complex. Racemization of the D-α-aminocaprolactam metal complex in the presence of the D,L-α-aminocaprolactam (which serves as base) is effected by heating at about 120° C. for one hour. The racemic mixture is then passed at 12 to a flash evaporator II wherein it is concentrated by removal of ethanol and water. Flashed solvent goes via line 13 to solvent recovery system X where it is rectified and used to provide, via lines 14, 15 and 29, the solvent necessary for the various washing steps. The concentrated solution from the evaporator II then passes at 16 to the crystallizer III where it is contacted with L-α-aminocaprolactam nickel complex seed crystals. Crystallization is effected by standing for 15 minutes at 50° C. The precipitate of optically impure L-α-aminocaprolactam nickel complex crystals is divided into two streams. A small aliquot is removed at 18, washed at IV with a water/ethanol mixture and returned to the crystallizer III as shown at 17 where it serves as the seed crystals. The wash solvent, which contains a small amount of dissolved D,L-α-aminocaprolactam nickel complex, is returned via 19 to flash evaporator II from whence the metal complex is recycled. The major portion of the precipitate goes as shown at 20 to decomposer V where the L-α-aminocaprolactam nickel complex is contacted at 50° C. for 5 minutes with HCl in aqueous ethanol. The contacting with HCl decomposes the L - α - aminocaprolactam nickel complex and precipitates L-α-aminocaprolactam hydrochloride which is shown being withdrawn at 32. The mother liquor removed at 21 comprises dissolved nickel chloride, a small amount of dissolved D,L-α - aminocaprolactam hydrochloride and solvent. This mother liquor is neutralized by contacting with a basic ion exchange column VI on which the D,L - α - aminocaprolactam hydrochloride is neutralized with ammonia fed at 31, to the free base (D,L-α-aminocaprolactam) which is then returned via line 22 along with nickel chloride and solvent to flash evaporator II. Ammonium chloride is withdrawn at 33. The nickel chloride added to the flash evaporator II in this manner provides the additional nickel ion necessary to complex both the D,L-α-aminocaprolactam returned from the ion-exchange column and also that initially added at racemizer I to provide the necessary base. The mother liquor removed at 23 from the crystallizer III which contains solvent, and D,L-α-aminocaprolactam nickel complex is concentrated in flash evaporator VII. The distillation residue exiting at 24 is contacted with D - α - aminocaprolactam nickel complex crystals in crystallizer VIII, affording as a precipitate crystals of D - α - aminocaprolactam nickel complex. The major portion of this precipitate is fed at 11 back into racemizer I, while a small aliquot at 26 is washed with solvent at IX and returned as seed through line 25 to crystallizer VIII with the solvent 27 going to evaporator VII. The mother liquor from crystallizer VIII containing D,L-nickel complex is fed at 28 into flash evaporator II. Thus, the only input to the system is D,L-α-aminocaprolactam plus HCl and ammonia. The output is pure L-α-aminocaprolactam hydrochloride and ammonium chloride. A small amount of ethanol and water is also added periodically to make up any lost during processing. It should be noted that the mother liquor from crystallizer III is indicated as containing D,L-nickel complex. In fact, as heretofore explained, it is slightly enriched in D-isomer since the L-crystals have been removed by the crystallization step. Conversely, the mother liquor from crystallizer VIII contains D,L-complex slightly enriched in L-isomer. Also, the crystals obtained from crystallizer III and VIII, although about 90% pure L- and D- respectively, contain some crystals of the other isomer. These are separated from the aliquot used for seeding by washing stage IV or IX. In the case of the major portion of the D-crystals coming from the crystallizer VIII, the presence of a small amount of L-isomer has no effect since the crystals are racemized at stage I. The slight quantity of other isomer crystals present in L-crystals from crystallizer III are eliminated as an impurity in the decomposition stage V, where the L-α-aminocaprolactam hydrochloride crystals formed are essentially of 100% optical purity with any D,L-isomer passing at 21 with the solvent into ion exchanger VI and thence via 22, to evaporator II. While the flow diagram shows the output from the racemizer after contact wth the metal forming complex and concentration is directed into the L-crystallizer it will be apparent that this output may alternatively be directed into the D-crystallizer.

We claim:
1. A method of effecting optical resolution of D,L-α-aminocaprolactam which comprises
   (a) forming a complex by admixing at a temperature of from about 10° C. to 100° C. in a solvent containing less than about 50% water, D,L,-α-aminocaprolactam and a compound containing a metal ion selected from the group consisting of nickel, cobalt, cupric, ferrous, ferric and zinc ions in amounts such that the mole ratio of said metal ion to said D,L-α-aminocaprolactam in the solution is in the range from about 1:4 to 1:2,
   (b) separating a solid phase rich in the D or L isomer by seeding said solution with at least 1% by weight of crystals of an aminocaprolactam metal complex of the D or L isomer, respectively, and
   (c) recovering the precipitated isomer complex precipitated by said seeding.
2. The method of claim 1 wherein after recovery of said precipitated isomer complex, said solution is seeded in sequence with crystals of the other of said isomers and recovering the isomer complex precipitated by the latter seeding.
3. The method of claim 1 wherein the complex formed in step (a) is a nickel complex.
4. The method of claim 1 wherein the complex is formed at a temperature of between about 35° C. and the boiling point of the solvent.
5. The method of claim 1 wherein the mother liquor after precipitation is concentrated to facilitate precipitation upon seeding by the other of said isomers.
6. The method of claim 1 wherein the uncomplexed isomer is recovered from the complex by forming a solution of the precipitated complex and thereafter decomposing said complex by acidifying and precipitating from said solution the acid salt of said isomer.
7. The method of claim 2 wherein after each precipitation the mother liquor is re-enriched with additional D,L-α-aminocaprolactam and wherein said solution is in sequence seeded again with the former isomer.
8. The method of claim 6 wherein acidification is effected with hydrochloric acid.
9. A continuous process for effecting optical resolution of D,L-α-aminocaprolactam which comprises:
   (a) forming a supersaturated solution complex by admixing at a temperature of from about 10 to 100° C. in a solvent containing less than about 50% water, D,L - α - aminocaprolactam with a complex forming metal ion selected from the group consisting of nickel, cobalt, cupric, ferrous, ferric and zinc ions in amounts such that the mole ratio of said metal ions to said D,L-α-aminocaprolactam in the solution is in the range from about 1:4 to 1:2;
   (b) in a crystallizer contacting said supersaturated solution with at least 1% by weight preformed seeds of the L-isomer of said α-aminocaprolactam complex;
   (c) separating the crystalline product of the L-isomer complex from the reaction mother liquor;
   (d) concentrating the resulting liquor from stage (c) to form a supersaturated solution and contacting said supersaturated solution in a crystallizer with at least 1% by weight of seed crystals of the D-isomer complex;
   (e) separating the formed D-isomer complex crystals;
   (f) concentrating the resulting liquor from stage (e) to form a supersaturated solution and recycling said supersaturated solution to stage (b);

(g) racemizing a portion of the D-isomer complex crystals by heating at a temperature of at least 100° C. in a solvent in the presence of at least a catalytic amount of free D,L-α-aminocaprolactam, contacting the racemized reaction mixture with one of said complex forming metals to yield a D,L-complex with a sufficient amount of said metal ion to complex free aminocaprolactam and introducing the balance of said D-isomer complex crystals as seed in stage (d);

(h) concentrating said solution from stage (g) and introducing said concentrate into one of said isomer crystallizers;

(i) decomposing a portion of the crystalline product from step (c) at temperature greater than 0° C. by contacting it with a hydrogen chloride containing solution and separating the resulting L-α-aminocaprolactam hydrochloride crystals; and recycling the balance of the crystalline product as seed to stage (b); and (j) treating the liquors from (i) with an ion exchange resin to eliminate excess hydrogen chloride and introducing the treated liquors which contain complex forming metal ion to the output of stage (g).

10. The process of claim 9 further involving purifying L-α-aminocaprolactam hydrochloride crystals by dissolving said crystals in an aqueous solvent and contacting the resulting solution with a metal chelating resin.

11. The process of claim 9 wherein the metal is nickel.

References Cited

UNITED STATES PATENTS 3,692,775   9/1972   Kubanek et al. ___ 260—239.3 R

ROBERT T. BOND, Primary Examiner

U.S. Cl. X.R.

260—534 L

PO-1050
(5/69)

UNITED STATES PATENT OFFICE
CERTIFICATE OF CORRECTION

Patent No. 3,824,231              Dated July 16, 1974

Inventor(s) Anne Marie Kubanek, Stylianos Sifniades and
Robert Furhmann

It is certified that error appears in the above-identified patent and that said Letters Patent are hereby corrected as shown below:

Column 1, line 3, last name on line, "Sieniades" should be -- Sifniades --.

Column 5, line 21, "(2 mole)" should be -- (2 mmole) --.

Column 5, line 22, "mole)" should be -- mmole) --.

Column 10, line 10, add the following claims:

-- 12. The method of claim 1 wherein the complex forming compound of step (a) is nickel chloride. --

-- 13. The process of claim 9 wherein the complex forming metal of step (a) comprises nickel chloride. --

Signed and sealed this 14th day of January 1975.

(SEAL)
Attest:

McCOY M. GIBSON JR.
Attesting Officer

C. MARSHALL DANN
Commissioner of Patents